Figure 1:
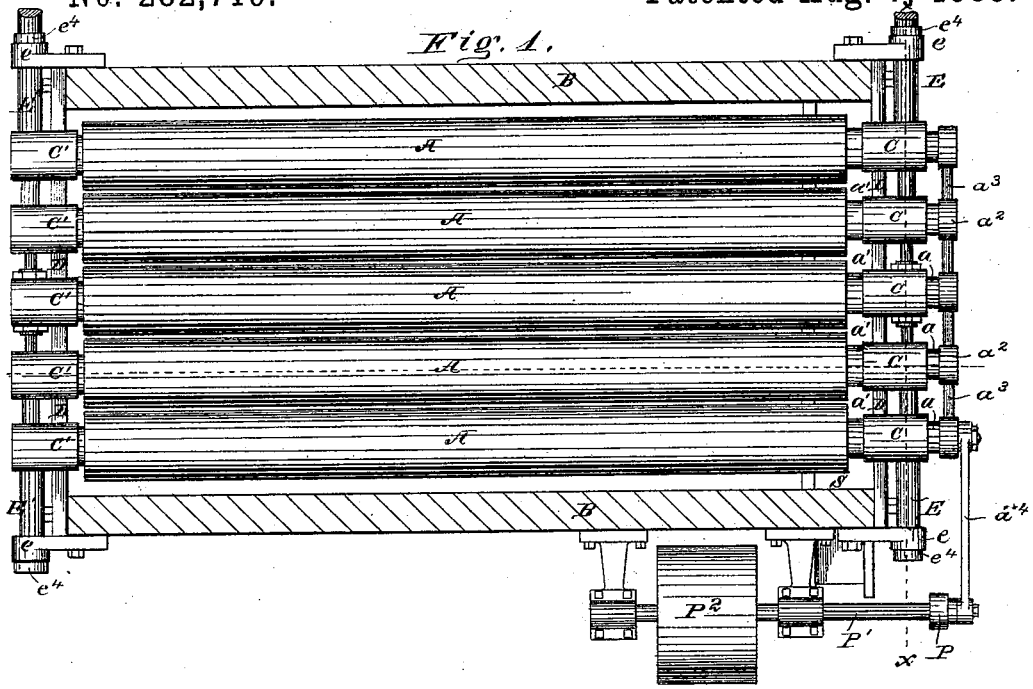

(No Model.)  3 Sheets—Sheet 1.

W. O. GUNCKEL.
SEPARATOR.

No. 282,719.  Patented Aug. 7, 1883.

WITNESSES  
F. W. Adams  
C. C. Poole

INVENTOR  
Winfield O. Gunckel  
per M. E. Dayton  
Attorney (No Model.) 3 Sheets—Sheet 2.

W. O. GUNCKEL.
SEPARATOR.

No. 282,719. Patented Aug. 7, 1883.

WITNESSES
F. U. Adams
C. C. Poole

INVENTOR
Winfield O. Gunckel
per M. E. Dayton
Attorney

N. PETERS. Photo-Lithographer, Washington, D. C.

(No Model.) 3 Sheets—Sheet 3.

W. O. GUNCKEL.
SEPARATOR.

No. 282,719. Patented Aug. 7, 1883.

UNITED STATES PATENT OFFICE.

WINFIELD O. GUNCKEL, OF TERRE HAUTE, INDIANA, ASSIGNOR OF TWO-THIRDS TO H. CLAY McKEEN AND JOHN D. KEFUSS, OF SAME PLACE.

SEPARATOR.

SPECIFICATION forming part of Letters Patent No. 282,719, dated August 7, 1883.

Application filed December 18, 1882. (No model.)

*To all whom it may concern:*

Be it known that I, WINFIELD O. GUNCKEL, of Terre Haute, in the county of Vigo and State of Indiana, have invented certain new and useful Improvements in Separators; and I do hereby declare that the following is a full, clear, and exact description thereof, reference being had to the accompanying drawings, and to the letters of reference marked thereon, which form a part of this specification.

This invention relates to devices for use, principally in flouring-mills, for separating foreign substances from grain and middlings, but adapted to a variety of similar purposes, such as the grading of wheat, &c.; and it consists in the matters hereinafter described, and pointed out in the claims.

A machine embodying said invention may be described as follows: Any desired number of smooth-faced rollers are arranged side by side in an inclined plane, the said rollers being inclined longitudinally and set at uniform distances apart, so as to retain the coarser parts of the material operated upon, and to allow the finer or smaller ones to pass through the spaces between them. The rollers are simultaneously and uniformly oscillated or rotated in the same direction on their axes, whereby the adjacent surfaces move in opposite directions at equal speeds, so that there is no tendency to force any substance downward between them by reason of their rotary or oscillating movement. The rollers being smooth-surfaced and inclined, as stated, the substances that are too large to pass downwardly between them gradually advance or slide toward their lower ends, where provision is made for their escape between the reduced extremities of the rollers into a transverse inclined spout, or an equivalent conveyer-box, by which they are led away and discharged. The rollers are mounted independently of each other and adjustable toward and from each other by means of horizontal differential screws threaded through projections on the journal-boxes, whereby the spaces between all the rollers may be simultaneously and uniformly varied to suit the material being operated upon. In flouring-mill separators I have made rollers from five-eighths of an inch to an inch and a half in diameter and from a foot to eighteen inches in length. Said rollers are herein shown as being mounted upon horizontal parallel guides attached to a hopper-bottomed box or chest or housing, and working in suitable grooves on the under face of the journal-boxes, which sustain the rollers at their opposite ends.

Figure 2:
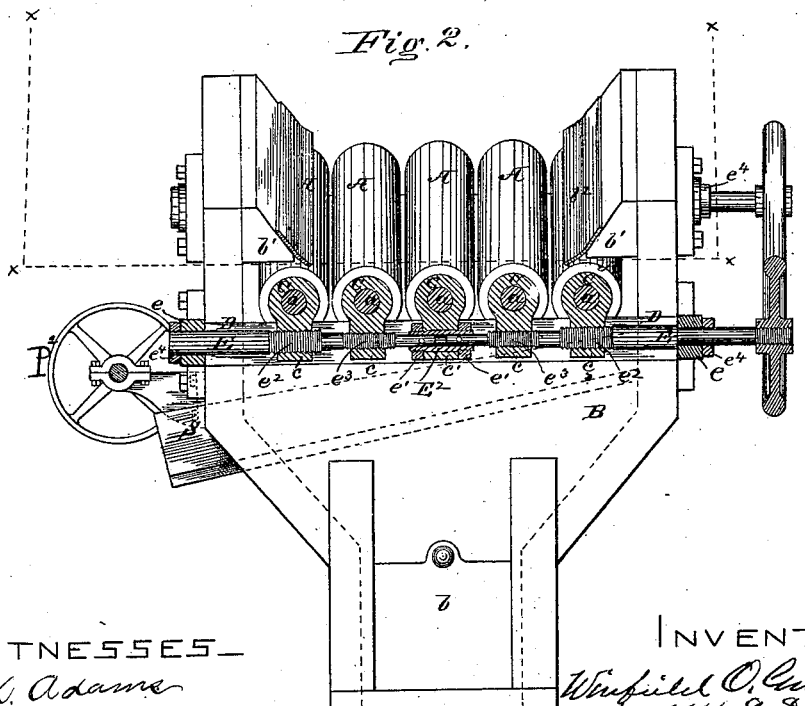
Figure 3:
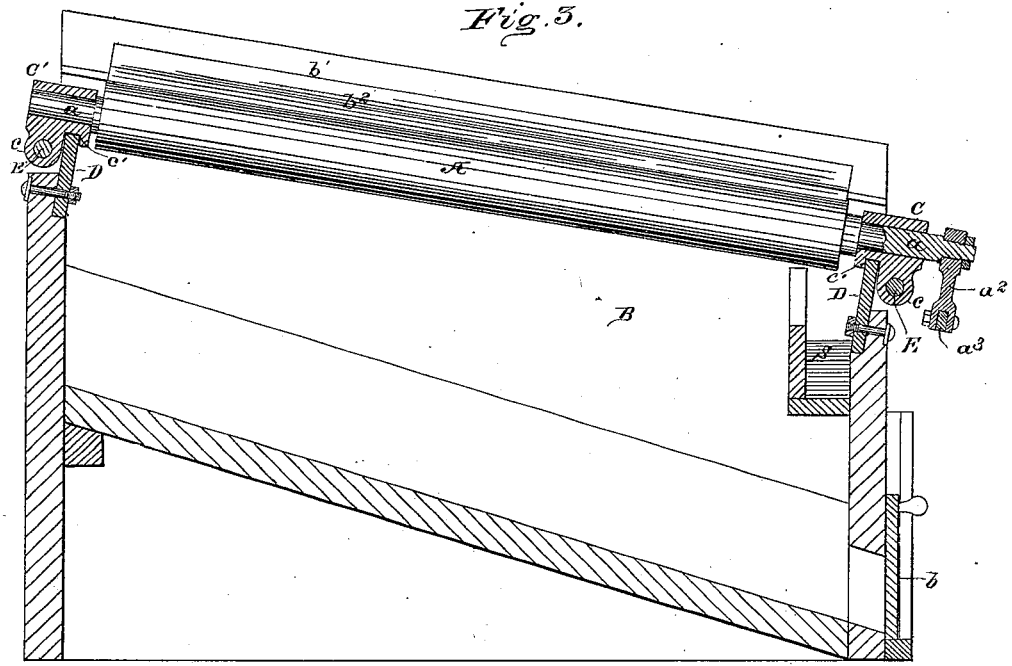
Figure 4:
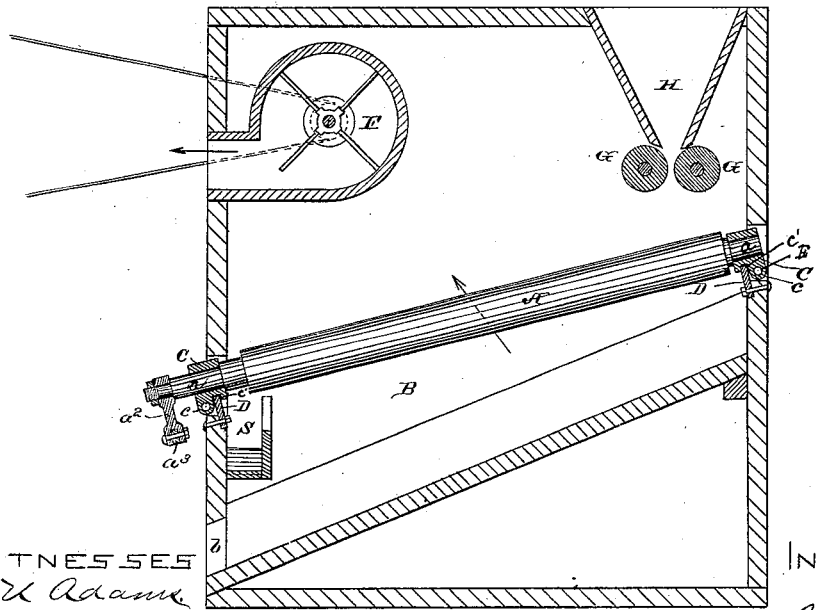
Figure 5:
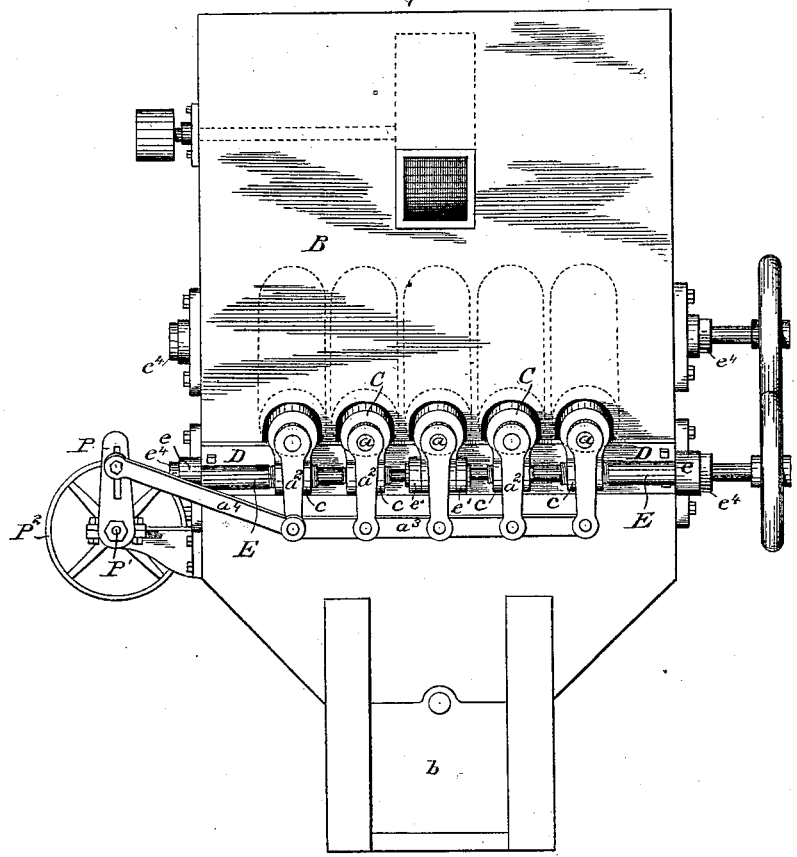

In the drawings, Figure 1 is a plan view of a series of rollers combined with operating devices and illustrated in connection with a hopper-box shown in a section taken in the plane of the upper surface of the rollers, as indicated by dotted line $x\ x$ of Fig. 2. Fig. 2 is an end view and vertical section through $x\ x$ of Fig. 1. Fig. 3 is a vertical section taken in a plane passing between two adjacent rollers. Fig. 4 is a section, similar to that of Fig. 3, of a machine adapted to apply an upward air-current between the rollers for the purpose of carrying off the lighter substances arrested by said rollers. Fig. 5 is an exterior view of the machine shown in Fig. 4, showing the ends of the roller-shafts and the devices for oscillating the rollers.

B represents a hopper-bottomed box or chest of suitable dimensions for the particular purpose to which the separator is to be applied, and A A a series of smooth-surfaced metal rollers therein, as will be described. The ends of the box or chest B are provided with transverse metal plates D D, parallel with each other and one lower than the other, said plates being intended to serve as supports and guides for the journal-boxes in which the rollers are mounted.

C C are the journal-boxes, to which are fitted the roller-spindles $a\ a$, and which are provided with transverse grooves $c'$ of proper size to admit the upper edges of the guide-plates D, so as to allow said boxes to slide toward and from each other on said guide-plates. The journal-boxes are provided with projections $c$, preferably located on their under sides, as shown in the drawings, and through these projections, at each end of the rollers, is threaded a differential screw, E E', having its several sections or threads so graduated in pitch that by the rotation of the screw said journal-boxes and the rollers supported thereby may be uniformly separated or brought together, as required. As illustrated in the drawings, the rollers A A are five in number, and, as in some cases a preferable construction, the central one is laterally stationary. The differential screws E and E' are also shown as being constructed in two separate tapering pieces, as plainly shown in Fig. 2, being joined at the central roller, A, by means of a sleeve, $E^2$, pinned to the several parts of the screws, and provided with the collars $e'$, one on each side of the journal-box that belongs to said central roller, A. The parts of the differentially-threaded shafts E E' are made in the usual manner—that is to say, of unequal diameter, reducing toward their joined ends, so as to be readily inserted through the journal-boxes and centrally joined, as described. Said screws are held longitudinally stationary by the collars $e^4$, arranged outside the stationary arms $e$, as seen in Fig. 2, or by any other suitable means for the purpose. At the lower ends of the rollers A said rollers are reduced in diameter at a point between their working-surfaces and the journal-boxes, so as to form spaces $a'$, (seen in Fig. 1,) for the purpose of allowing the larger substances retained by the rollers to pass downward after sliding along the roller to this point. Beneath the spaces $a'$ is located a transverse inclined spout, S, which receives the said larger substances and conveys them out of the machine.

Either one of a variety of well-known devices may be employed for giving the necessary uniform oscillation to the rollers. In the drawings I have illustrated for this purpose a series of depending crank-arms, $a^2$, (shown more clearly in Fig. 5,) the lower ends of which are connected to a rod, $a^3$, and which are actuated by means of a pitman, $a^4$, from a crank, P. The crank P is made with sufficient throw to move the ends of the crank-arms $a^2$ through such part of a revolution as it is found desirable to oscillate the rollers, and is mounted on a shaft, P', which may be rotated by means of a pulley, $P^2$, or otherwise.

The rollers A may be rotated constantly in one direction at equal speeds, whereby the same result may be obtained by any of the well-known devices suited to the purpose; but I prefer the construction and mode of operation before described.

For the purpose of preventing the escape of material at the sides of the machine, stationary cleats $b'$ are attached to the inner side walls of the box B, and arranged to overhang the outer rollers A. They may, for operation upon some substances, be advantageously provided with flexible flaps or plates $b^2$, which bear against the surface of the adjacent rollers. The differential screws E E' may, of course, each be made in one continuous shaft, if preferred, and either marginal roller may be the stationary one; or, if desired, all the rollers may be laterally movable with reference to a stationary point external to the rollers.

In Figs. 4 and 5 the hopper-bottomed box B is shown as a housing provided with a feed-hopper, H, and feed-rollers G, arranged to deliver the material to be separated upon the rollers A at or near their upper ends. The box B is also shown as inclosed at the top and provided with a fan, F, arranged above the rollers A, and operating to produce an upward air-current between the rollers for the purpose of carrying off the dust and light impurities present in the material being purified.

The operation of the machine is perhaps sufficiently apparent from the above description. The series of rollers A, arranged and oscillated or rotated, as described, form a series of inclined troughs, having narrow longitudinal openings in the bottom, through which the proper material may fall into the receptacle below. The coarser substances [are arrested in the troughs, and, by reason of the inclination of said troughs, said arrested substances are made or permitted to gradually slide toward the lower ends of the rollers, and are discharged through the spaces A' into the subjacent spout or conveyer S. A uniform or equal speed of the several smooth-surfaced rollers in their oscillation serves to prevent a downward feeding action of the rollers; but when arranged to constantly rotate, the rollers may, if preferred, be differently speeded, so that the upwardly-moving roller-surfaces shall move faster than the adjacent downwardly-moving surfaces without departure from my invention.

I am aware that roller-separators have heretofore been used for various purposes, and do not, therefore, claim such separator broadly; but my invention is limited to the several improvements in the construction of such separators, as pointed out in the following claims.

I claim as my invention—

1. In a separator, the combination of a series of rollers arranged side by side, mechanism constructed to oscillate said rollers in the same direction, and mechanism for adjusting the spaces between the rollers, whereby all the said spaces will be equal and may be equally varied, substantially as described.

2. In a separator, the combination of a box or chest, B, horizontal supports D at opposite ends thereof, a series of inclined rollers, journal-boxes for said rollers, movably sustained by the supports D, differential screws applied to the journal-boxes, and means for actuating the rollers, substantially as described.

3. In the separator described, the combination, with the separate journal-boxes for the rollers, of a differential screw constructed in two parts, oppositely graduated as to the pitch of the screws from the junction of the parts outwardly, substantially as described.

4. In an adjustable roller-separator, the combination, with the roller journal-boxes, of a differential screw graduated as to the pitch of the screw-threads, as described, means for holding the screw longitudinally stationary, and means for retaining one journal-box in a fixed position on said screw, substantially as described.

In testimony that I claim the foregoing as my invention I affix my signature in presence of two witnesses.

WINFIELD O. GUNCKEL.

Witnesses:
H. CLAY McKEEN,
JOHN D. KEFUSS.